United States Patent [19]

Zuiches

[11] Patent Number: 4,930,543
[45] Date of Patent: Jun. 5, 1990

[54] PROTECTIVE COVER FOR HOSE CONNECTORS

[76] Inventor: Eugene A. Zuiches, 2214 SE. 30th Ave., Portland, Oreg. 97214

[21] Appl. No.: 277,427

[22] Filed: Nov. 25, 1988

[63] This app is a Con of 06/943,800 12/19/86 ABN

[51] Int. Cl.$^5$ .................. F16L 57/00; F16L 58/18; F16L 59/16
[52] U.S. Cl. ................... 138/110; 138/149; 137/375; 285/45; 285/47; 285/419
[58] Field of Search .................. 150/52 R, 154; 138/96 R, 110, 149, 147, 118.1, 120; 137/375, 377; 285/45, 53, 254, 419, 47

[56] References Cited

U.S. PATENT DOCUMENTS

| | | | |
|---|---|---|---|
| 2,708,123 | 5/1955 | Risley et al. | 285/45 |
| 2,708,950 | 5/1955 | Averett | 138/96 R |
| 3,038,558 | 6/1962 | Plummer | 150/52 R X |
| 3,941,159 | 3/1976 | Toll | 150/52 R X |
| 4,142,565 | 3/1979 | Plunkett, Sr. | 150/52 R |
| 4,207,918 | 6/1980 | Burns et al. | 138/149 X |
| 4,556,082 | 12/1985 | Riley et al. | 138/149 |
| 4,607,866 | 8/1986 | Erichman | 285/419 X |

FOREIGN PATENT DOCUMENTS 1022063 1/1958 Fed. Rep. of Germany ........ 285/45

Primary Examiner—Sue A. Weaver

[57] ABSTRACT

A flexible body member is constructed so as to be wrapped around a hose at connector portions thereof and has overlapping side portions. The body member has releasable securement on its overlapping areas and also has a widened portion intermediate the ends thereof for accommodating the interfitting coupling members and for holding the device on the coupling members. The releasable securement on the overlapping side areas is by continuous and full length fastening elements such as Velcro. The device also has padding to provide desired cushioning and insulation.

1 Claim, 1 Drawing Sheet

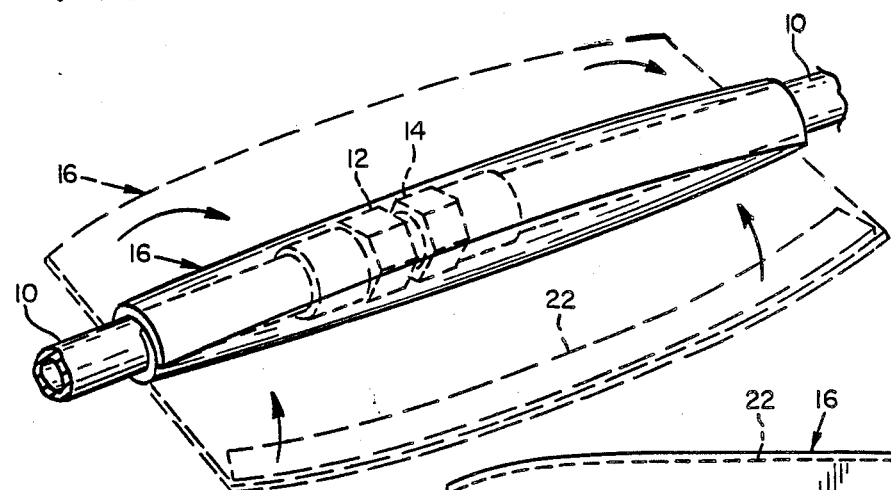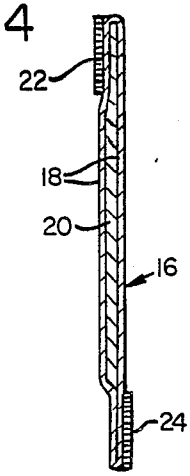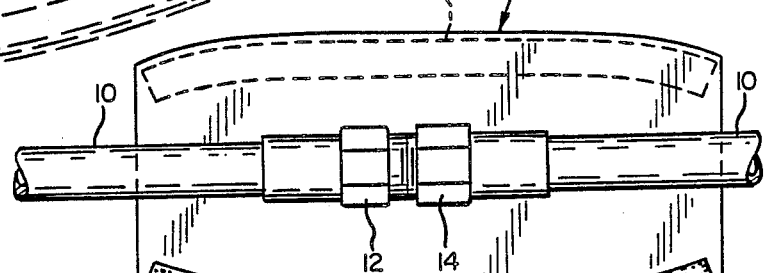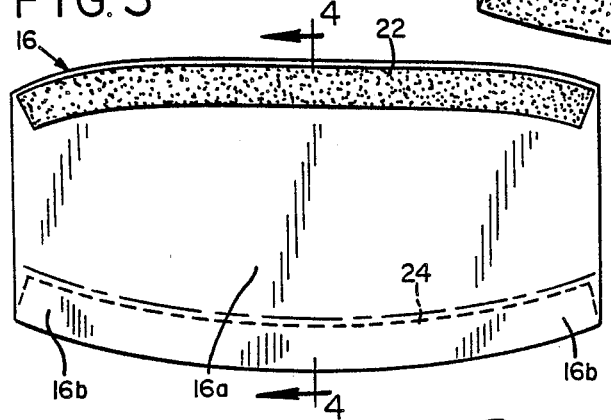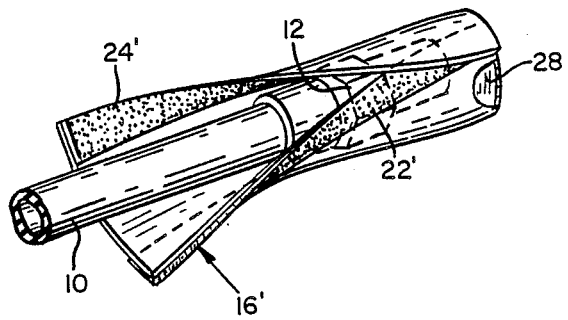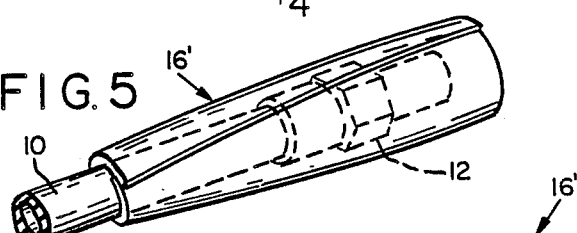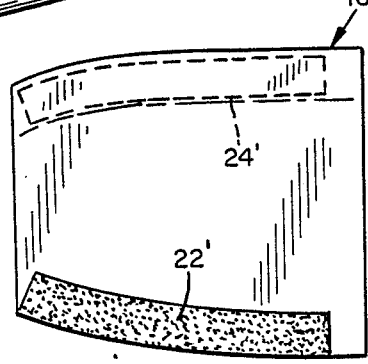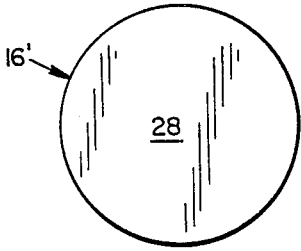

PROTECTIVE COVER FOR HOSE CONNECTORS

This application is a Continuation, of application Ser. No. 943,800, filed Dec. 19, 1986, now abandoned.

BACKGROUND OF THE INVENTION

This invention relates to a new and novel protective cover for hose connectors.

Hoses often have various connectors between sections thereof to extend the length of the hose so as to provide connection to power equipment or for other reasons. These connectors are usually metal, and are larger than the hose itself. They thus form shoulders or the like adapted to engage and damage building parts or articles when the hose is dragged in an axial direction. For example, in the truck-mounted steam cleaning business, high pressure water lines are joined together by brass or steel connectors, and these lines are dragged into and out of buildings and through various parts thereof for establishing connection between a cleaning head in the building and power equipment contained outside of the building. As these lines are dragged back and forth, the connectors catch on doors, door jambs, furniture, or other articles, and this can cause damage to the building or articles therein.

Also, the connectors themselves are subject to damage when they are dragged along the floor or driveway and also when dropped for example from windows when cleaning multiple story buildings.

SUMMARY OF THE INVENTION

According to the present invention and forming a primary objective thereof, a protective cover is provided for hose connectors designed to overcome the disadvantages enumerated above.

More particularly, a wrap-around cover is provided having a special design arranged to maintain a hold on connector portions between hose sections and also arranged to protect such connector portions as well as building parts and articles when the hose is dragged in an axial direction.

A more particular object is to provide a flexible body member having releasable securing means on overlapping areas of its side portions and also having a widened portion intermediate the ends thereof for accommodating the connectors when wrapped on the hose.

It is a further object to provide a cover device of the type described which includes padding therein whereby to provide adequate protection for both the connector and the building or parts thereof and also to serve other purposes such as for insulation during winter.

The invention will be better understood and additional objects and advantages will become apparent from the following description taken in connection with the accompanying drawings.

BRIEF DESCRIPTION OF THE DRAWINGS

FIG. 1 is a perspective view of a pair of hose sections and a connector therebetween, the latter being shown in broken lines and covered by the present protective cover fastened thereon, this view also showing in broken lines the cover in opened out condition;

FIG. 2 is a plan view of one surface of the present cover in opened out condition;

FIG. 3 is a plan view of the opposite surface of the cover;

FIG. 4 is an enlarged cross section view taken on the line 4—4 of FIG. 3;

FIG. 5 is a perspective view of a modified form of the device for application to a connector half on one hose section;

FIG. 6 is a view similar to FIG. 5 but showing partial installation or removal of the cover;

FIG. 7 is a plan view of one surface of the embodiment of FIGS. 5 and 6; and

FIG. 8 is an end view of the device taken from the right side of FIG. 5.

DETAILED DESCRIPTION OF PREFERRED EMBODIMENTS

With reference first to FIGS. 1 and 2, the numeral 10 designates a pair of flexible hose sections 10 attached by interfitting connectors 12 and 14. With reference to FIGS. 1 through 4, a first embodiment of the invention comprises a cover 16 arranged to be wrapped around the connectors 12 and 14 of the hose sections and provide protection for such connectors as well as protection for building parts or articles in the building when the hose is moved. The cover comprises a body member of sufficient length to adequately cover the connector portions and includes outer layers 18 of tough flexible material such as a vinyl covered nylon material. This type of material is substantially friction free to allow the device to slide freely over and around edges and irregular surfaces and also to resist water and soiling damage. The two layers 18 confine a padding or cushioning layer 20 which provides cushioning and insulation.

The width of the cover 16 is sufficient to wrap fully around the connectors and to have overlapping areas along the side edges thereof. These overlapping areas have releasable securing means 22 and 24 secured thereto arranged to securely but releasably hold the device in place during all movements of the hoses. Preferably, the releasable connecting portions 22 and 24 comprise hook and eye attaching means such as that sold under the trademark Velcro.

As best seen in FIGS. 2 and 3, side edges of the body member are convexly shaped so that the central portion 16a of the body member is wider than the end portions 16b whereby to accommodate the covering of the enlarged connectors portions 12 and 14 and also to form restricted ends which lock the connectors therein. In a preferred structure, the fastening elements 22 and 24 extend continuously and along the full length of the contour of the side portions of the body member whereby when attached in the wrap-around condition, there will be a cushioned smooth, non-bulging connection which will not catch on building parts or articles therein. When the cover is installed on the connector portion, it is preferred that the fastening element 24 overlap exteriorly the fastening element 22, and in the construction of the cover, the padding layer 20 does not extend into the area of fastening element 24. This particular structure allows the fastening element 24 to be connected to the fastening element 22 in a smooth, non-bulging connection even though there is a little curvature therein.

With reference to FIGS. 5–8, a similar structure is provided but designed for only one hose section and its connector end. For this purpose, the body member 16' is shorter in length but includes Velcro fastening elements 22' and 24' along its side edges similar to the first embodiment. This second embodiment, however, is constructed with a closed wall 28 at one end. The side dges lead substantially fully to the end wall and form laps, FIG. 6, which allow the device to be opened and closed. In its use, it is opened up and slipped over the connector end of the one hose section and the fastener portions fitted tightly around the hose. This embodiment also is widened in the center thereof relative to the pen end whereby when fastened on the hose, the reduced diameter end will confine the larger connector portion within the cover. The wall 28 prevents the cover from moving down on the hose.

According to the invention, a cover of the type described is provided which is simplified in construction and inexpensive to manufacture. It provides good protection for the hose connectors and also for building parts and articles in the building from damage by the connectors when the hose is moved axially. The shape of the device in both of its embodiments provides a good attachment on a hose since the restricted end portion or portions will not allow the enlarged connectors to move therethrough. In addition to the padding providing protection, it also serves as insulation in cold weather.

It is to be understood that the forms of my invention herein shown and described are to be taken as preferred examples of the same and that various changes in the shape, size and arrangement of parts may be resorted to without departing from the spirit of my invention, or the scope of the subjoined claims.

Having thus described my invention, I claim:

1. In combination, a flexible hose having a connector portion therein, said connector portion being enlarged relative to the hose;

a protective cover for said connector portion having inner and outer portions, opposite end edges, and defining side portions terminating in longitudinal side edges, and a cushioning layer on the inner portion of said cover, the outer portion of said cover having a substantially friction free outer surface, said cover being wrapped fully around and fully covering said connector portion as well as hose portions adjacent to said connector portion, the said defining side portions of said cover being disposed in overlapping relation, and continuous and full length releasable securing means on overlapping areas of said defining side portions, said side edges of said cover having a convex configuration along their full length to provide said cover with a widened portion intermediate the ends thereof for accommodating the enlarged connector portion and adjacent hose portions in a mounted position of the cover on said hose and for forming a wrapped structure tapered toward at least one end and thus capable of efficiently moving past obstacles when said hose is dragged longitudinally, said cushioning layer protecting obstacles as said hose is dragged thereby and furthermore smoothing out the profile of the connector portion to contribute to efficient movement of the covered connector past the obstacles.

* * * * *